US008874480B2

(12) United States Patent
Panthaki et al.

(10) Patent No.: US 8,874,480 B2
(45) Date of Patent: Oct. 28, 2014

(54) CENTRALIZED PAYMENT METHOD AND SYSTEM FOR ONLINE AND OFFLINE TRANSACTIONS

(75) Inventors: Behram Panthaki, Jersey City, NJ (US); Aaron Rudenstine, New York, NY (US); Jeremy Sokolic, New York, NY (US); Amir Sunderji, San Jose, CA (US); Sanjeev Dheer, Scarsdale, NY (US); Neil Platt, New York, NY (US); Demetris Papademetriou, New York, NY (US)

(73) Assignee: Fiserv, Inc., Brookfield, WI (US)

( * ) Notice: Subject to any disclaimer, the term of this patent is extended or adjusted under 35 U.S.C. 154(b) by 0 days.

(21) Appl. No.: 13/488,403

(22) Filed: Jun. 4, 2012

(65) Prior Publication Data

US 2012/0245983 A1 Sep. 27, 2012

Related U.S. Application Data

(63) Continuation of application No. 12/109,309, filed on Apr. 24, 2008, now abandoned.

(60) Provisional application No. 60/957,634, filed on Aug. 23, 2007, provisional application No. 60/926,619, filed on Apr. 27, 2007.

(51) Int. Cl.
*G06Q 40/00* (2012.01)
*G06Q 20/10* (2012.01)

(52) U.S. Cl.
CPC .............. *G06Q 20/102* (2013.01); *G06Q 20/10* (2013.01); *G06Q 20/1085* (2013.01)
USPC ................................. 705/40; 705/39; 705/43

(58) Field of Classification Search
None
See application file for complete search history.

(56) References Cited

U.S. PATENT DOCUMENTS 4,346,442 A 8/1982 Musmanno
4,694,397 A 9/1987 Grant et al.
(Continued)

FOREIGN PATENT DOCUMENTS

EP 1229480 8/2002
EP 1533726 5/2005
(Continued)

OTHER PUBLICATIONS

Jennifer A. Kingson et al. "E-Processing by Banks: Idea Gains Ground", American Banker, Apr. 26, 2001.
(Continued)

*Primary Examiner* — Ryan Zeender
*Assistant Examiner* — Denisse Ortiz Roman
(74) *Attorney, Agent, or Firm* — Sutherland, Asbill & Brennan, LLP

(57) ABSTRACT

Embodiments described herein include an electronic transaction service network (also referred to herein as a centralized electronic transaction (CET) service). According to an embodiment, a financial management system hosts multiple CET web sites on behalf of multiple merchants. All transactions through any CET web site are executed and managed by the financial management system. Merchants may customize their web sites to include a branded look and feel. The merchant web sites are part of a CET service for which a customer can register. Registered customers can then view and pay invoices from any merchants having CET web sites, whether purchases were made online or offline. Customers specify preferences for the CET service including choosing existing customer accounts from which the financial management system is to pay invoices on behalf of the customer. This eliminates the need for the customer to open and fund a separate payment account as in traditional methods.

28 Claims, 10 Drawing Sheets

(56) References Cited

U.S. PATENT DOCUMENTS

| | | |
|---|---|---|
| 4,799,156 A | 1/1989 | Shavit et al. |
| 4,823,264 A | 4/1989 | Deming |
| 5,007,084 A | 4/1991 | Materna et al. |
| 5,220,501 A | 6/1993 | Lawlor et al. |
| 5,283,829 A | 2/1994 | Anderson |
| 5,326,959 A | 7/1994 | Perazza |
| 5,329,589 A | 7/1994 | Fraser et al. |
| 5,383,113 A | 1/1995 | Kight et al. |
| 5,424,938 A | 6/1995 | Wagner et al. |
| 5,465,206 A | 11/1995 | Hilt et al. |
| 5,481,720 A | 1/1996 | Loucks et al. |
| 5,483,445 A | 1/1996 | Pickering |
| 5,484,988 A | 1/1996 | Hills et al. |
| 5,504,677 A | 4/1996 | Pollin |
| 5,644,727 A | 7/1997 | Atkins |
| 5,649,117 A | 7/1997 | Landry |
| 5,650,604 A | 7/1997 | Marcus et al. |
| 5,652,786 A | 7/1997 | Rogers |
| 5,655,089 A | 8/1997 | Bucci |
| 5,659,165 A | 8/1997 | Jennings et al. |
| 5,671,279 A | 9/1997 | Elgamal |
| 5,694,551 A | 12/1997 | Doyle et al. |
| 5,696,902 A | 12/1997 | Leclercq et al. |
| 5,699,528 A | 12/1997 | Hogan |
| 5,745,706 A | 4/1998 | Wolfberg et al. |
| 5,754,655 A | 5/1998 | Hughes et al. |
| 5,757,917 A | 5/1998 | Rose et al. |
| 5,787,427 A | 7/1998 | Benantar et al. |
| 5,794,221 A | 8/1998 | Egendorf |
| 5,805,719 A | 9/1998 | Pare, Jr. et al. |
| 5,809,144 A | 9/1998 | Sirbu |
| 5,825,856 A | 10/1998 | Porter et al. |
| 5,826,241 A | 10/1998 | Stein et al. |
| 5,826,243 A | 10/1998 | Musmanno et al. |
| 5,826,245 A | 10/1998 | Sandberg-Diment |
| 5,832,460 A | 11/1998 | Bednar et al. |
| 5,848,400 A | 12/1998 | Chang |
| 5,855,020 A | 12/1998 | Kirsch |
| 5,870,724 A | 2/1999 | Lawlor et al. |
| 5,873,072 A | 2/1999 | Kight |
| 5,884,285 A | 3/1999 | Atkins |
| 5,884,288 A | 3/1999 | Chang et al. |
| 5,893,078 A | 4/1999 | Paulson |
| 5,893,080 A | 4/1999 | McGurl et al. |
| 5,895,838 A | 4/1999 | Harjunmaa et al. |
| 5,903,878 A | 5/1999 | Talati et al. |
| 5,909,492 A | 6/1999 | Payne et al. |
| 5,915,023 A | 6/1999 | Bernstein |
| 5,920,847 A | 7/1999 | Kolling et al. |
| 5,920,848 A | 7/1999 | Schutzer et al. |
| 5,930,773 A | 7/1999 | Crooks et al. |
| 5,940,809 A | 8/1999 | Musmanno et al. |
| 5,943,656 A | 8/1999 | Crooks et al. |
| 5,949,044 A | 9/1999 | Walker et al. |
| 5,963,647 A | 10/1999 | Downing et al. |
| 5,963,925 A | 10/1999 | Kolling et al. |
| 5,966,698 A | 10/1999 | Pollin |
| 5,974,146 A | 10/1999 | Randle et al. |
| 5,978,780 A | 11/1999 | Watson |
| 6,012,035 A | 1/2000 | Freeman, Jr. et al. |
| 6,012,048 A | 1/2000 | Gustin et al. |
| 6,016,484 A | 1/2000 | Williams et al. |
| 6,018,722 A | 1/2000 | Ray et al. |
| 6,023,684 A | 2/2000 | Pearson |
| 6,029,147 A | 2/2000 | Horadan et al. |
| 6,029,150 A | 2/2000 | Kravitz |
| 6,031,625 A | 2/2000 | Sherman et al. |
| 6,035,285 A | 3/2000 | Schlect |
| 6,038,603 A | 3/2000 | Joseph |
| 6,039,250 A | 3/2000 | Ito et al. |
| 6,044,362 A | 3/2000 | Neely |
| 6,047,268 A | 4/2000 | Bartoli |
| 6,049,785 A | 4/2000 | Gifford |
| 6,049,786 A | 4/2000 | Smorodinsky |
| 6,052,674 A | 4/2000 | Zervides et al. |
| 6,055,567 A | 4/2000 | Ganesan et al. |
| 6,058,378 A | 5/2000 | Clark et al. |
| 6,058,380 A | 5/2000 | Anderson et al. |
| 6,064,990 A | 5/2000 | Goldsmith |
| 6,070,150 A | 5/2000 | Remington |
| 6,078,907 A | 6/2000 | Lamm |
| 6,088,683 A | 7/2000 | Jalili |
| 6,088,688 A | 7/2000 | Crooks |
| 6,108,641 A | 8/2000 | Kenna et al. |
| 6,108,788 A | 8/2000 | Moses et al. |
| 6,128,603 A | 10/2000 | Dent et al. |
| 6,164,528 A | 12/2000 | Hills et al. |
| 6,173,272 B1 | 1/2001 | Thomas et al. |
| 6,199,077 B1 | 3/2001 | Inala et al. |
| 6,223,168 B1 | 4/2001 | McGurl et al. |
| 6,226,623 B1 | 5/2001 | Schein et al. |
| 6,227,447 B1 | 5/2001 | Campisano |
| 6,240,399 B1 | 5/2001 | Frank et al. |
| 6,263,446 B1 | 7/2001 | Kausik et al. |
| 6,263,447 B1 | 7/2001 | French et al. |
| 6,275,934 B1 | 8/2001 | Novicov |
| 6,285,991 B1 | 9/2001 | Powar |
| 6,289,322 B1 | 9/2001 | Kitchen et al. |
| 6,292,789 B1 | 9/2001 | Schutzer |
| 6,304,857 B1 | 10/2001 | Heindel et al. |
| 6,304,860 B1 | 10/2001 | Martin et al. |
| 6,311,170 B1 | 10/2001 | Embrey |
| 6,317,783 B1 | 11/2001 | Freishtat et al. |
| 6,321,334 B1 | 11/2001 | Jerger et al. |
| 6,324,523 B1 | 11/2001 | Killeen, Jr. et al. |
| 6,327,577 B1 | 12/2001 | Garrison et al. |
| 6,363,362 B1 | 3/2002 | Burfield et al. |
| 6,363,363 B1 | 3/2002 | Haller et al. |
| 6,374,229 B1 | 4/2002 | Lowrey et al. |
| 6,374,231 B1 | 4/2002 | Bent et al. |
| 6,381,592 B1 | 4/2002 | Reuning |
| 6,385,595 B1 | 5/2002 | Kolling et al. |
| 6,405,245 B1 | 6/2002 | Burson et al. |
| 6,412,073 B1 | 6/2002 | Rangan |
| 6,438,527 B1 | 8/2002 | Powar |
| 6,473,800 B1 | 10/2002 | Jerger et al. |
| 6,483,599 B1 | 11/2002 | Woodman et al. |
| 6,493,685 B1 | 12/2002 | Ensel et al. |
| 6,510,451 B2 | 1/2003 | Wu et al. |
| 6,513,019 B2 | 1/2003 | Lewis |
| 6,560,581 B1 | 5/2003 | Fox |
| 6,567,850 B1 | 5/2003 | Freishtat et al. |
| 6,594,766 B2 | 7/2003 | Rangan et al. |
| 6,598,028 B1 | 7/2003 | Sullivan et al. |
| 6,606,606 B2 | 8/2003 | Starr |
| 6,609,113 B1 | 8/2003 | O'Leary et al. |
| 6,609,128 B1 | 8/2003 | Underwood |
| 6,615,193 B1 | 9/2003 | Kingdom et al. |
| 6,633,910 B1 | 10/2003 | Rajan et al. |
| 6,678,664 B1 | 1/2004 | Ganesan |
| 6,697,860 B1 | 2/2004 | Kung |
| 6,704,714 B1 | 3/2004 | O'Leary et al. |
| 6,721,716 B1 | 4/2004 | Gross |
| 6,760,470 B1 | 7/2004 | Bogosian |
| 6,792,082 B1 | 9/2004 | Levine |
| 6,799,167 B1 | 9/2004 | Gullen et al. |
| 6,802,042 B2 | 10/2004 | Rangan et al. |
| 6,826,542 B1 | 11/2004 | Virgin |
| 6,908,030 B2 | 6/2005 | Rajasekaran et al. |
| 6,922,673 B2 | 7/2005 | Karas et al. |
| 6,931,382 B2 | 8/2005 | Laage et al. |
| 6,948,063 B1 | 9/2005 | Ganesan et al. |
| 6,968,319 B1 | 11/2005 | Remington |
| 6,996,542 B1 | 2/2006 | Landry |
| 7,010,512 B1 | 3/2006 | Gillin |
| 7,013,310 B2 | 3/2006 | Messing et al. |
| 7,089,208 B1 | 8/2006 | Levchin et al. |
| 7,120,608 B1 | 10/2006 | Gallagher et al. |
| 7,130,807 B1 | 10/2006 | Mikurak |
| 7,130,817 B2 | 10/2006 | Karas et al. |
| 7,146,338 B2 | 12/2006 | Kight et al. |
| 7,177,836 B1 | 2/2007 | German et al. |
| 7,191,151 B1 | 3/2007 | Nosek |
| 7,206,768 B1 | 4/2007 | deGroeve |

(56) References Cited

U.S. PATENT DOCUMENTS

| | | |
|---|---|---|
| 7,216,104 B2 | 5/2007 | Mason |
| 7,251,656 B2 | 7/2007 | Keown et al. |
| 7,302,411 B2 | 11/2007 | Ganesan et al. |
| 7,333,953 B1 | 2/2008 | Banaugh et al. |
| 7,343,335 B1 | 3/2008 | Olliphant |
| 7,366,696 B1 | 4/2008 | Ganesan et al. |
| 7,373,329 B2 | 5/2008 | Gallagher et al. |
| 7,376,587 B1 | 5/2008 | Neofytides |
| 7,392,223 B1 | 6/2008 | Ganesan et al. |
| 7,395,241 B1 | 7/2008 | Cook et al. |
| 7,395,243 B1 | 7/2008 | Zielke |
| 7,395,319 B2 | 7/2008 | Harris et al. |
| 7,395,436 B1 | 7/2008 | Nemovicher |
| 7,398,229 B2 | 7/2008 | Budish |
| 7,430,537 B2 | 9/2008 | Templeton et al. |
| 7,433,845 B1 | 10/2008 | Flitcroft et al. |
| 7,487,113 B2 | 2/2009 | Ray |
| 7,499,875 B1 | 3/2009 | May et al. |
| 7,499,886 B2 | 3/2009 | Matsuda et al. |
| 7,502,749 B2 | 3/2009 | Ganesan et al. |
| 7,512,552 B2 | 3/2009 | Karas et al. |
| 7,562,037 B2 | 7/2009 | Wright |
| 7,568,615 B2 | 8/2009 | Corona et al. |
| 7,587,342 B2 | 9/2009 | Neofytides et al. |
| 7,596,529 B2 | 9/2009 | Mascavage, III et al. |
| 7,606,734 B2 | 10/2009 | Baig et al. |
| 7,610,222 B2 | 10/2009 | Neofytides et al. |
| 7,653,598 B1 | 1/2010 | Hamilton et al. |
| 7,656,598 B2 | 2/2010 | Iida |
| 7,672,879 B1 | 3/2010 | Kumar et al. |
| 7,676,431 B2 | 3/2010 | O'Leary et al. |
| 7,689,482 B2 | 3/2010 | Lam |
| 7,711,690 B1 | 5/2010 | Garrison et al. |
| 7,734,543 B2 | 6/2010 | Braco |
| 7,756,786 B2 | 7/2010 | Trende et al. |
| 7,788,172 B2 | 8/2010 | Kight et al. |
| 7,792,749 B2 | 9/2010 | Ganesan |
| 7,809,615 B2 | 10/2010 | Hui |
| 7,809,639 B2 | 10/2010 | Hobday et al. |
| 7,848,972 B1 | 12/2010 | Sharma |
| 7,937,325 B2 | 5/2011 | Kumar et al. |
| 7,945,491 B2 | 5/2011 | Sharma |
| 7,953,660 B2 | 5/2011 | Ganesan et al. |
| 7,953,663 B1 | 5/2011 | Lekachman |
| 8,024,229 B2 | 9/2011 | Baig et al. |
| 8,170,954 B2 | 5/2012 | Keresman et al. |
| 8,595,100 B2 | 11/2013 | Kight et al. |
| 8,620,782 B2 | 12/2013 | Kight et al. |
| 2001/0027527 A1 | 10/2001 | Khidekel et al. |
| 2001/0034717 A1 | 10/2001 | Whitworth |
| 2001/0037295 A1 | 11/2001 | Olsen |
| 2002/0002536 A1 | 1/2002 | Braco |
| 2002/0010768 A1 | 1/2002 | Marks et al. |
| 2002/0016769 A1 | 2/2002 | Barbara et al. |
| 2002/0019753 A1 | 2/2002 | Boden |
| 2002/0019808 A1 | 2/2002 | Sharma |
| 2002/0025765 A1 | 2/2002 | Sangster et al. |
| 2002/0029190 A1 | 3/2002 | Gutierrez-Sheris |
| 2002/0029193 A1 | 3/2002 | Ranjan et al. |
| 2002/0046065 A1 | 4/2002 | Nighan |
| 2002/0046341 A1 | 4/2002 | Kazaks et al. |
| 2002/0052841 A1 | 5/2002 | Guthrie et al. |
| 2002/0062281 A1 | 5/2002 | Singhal |
| 2002/0065774 A1 | 5/2002 | Young et al. |
| 2002/0087461 A1 | 7/2002 | Ganesan et al. |
| 2002/0087462 A1 | 7/2002 | Seifert et al. |
| 2002/0087468 A1 | 7/2002 | Ganesan et al. |
| 2002/0095298 A1 | 7/2002 | Ewing |
| 2002/0095387 A1 | 7/2002 | Sosa et al. |
| 2002/0099607 A1 | 7/2002 | Sosa et al. |
| 2002/0107767 A1 | 8/2002 | McClair et al. |
| 2002/0116331 A1 | 8/2002 | Cataline et al. |
| 2002/0120568 A1 | 8/2002 | Leblang et al. |
| 2002/0128967 A1 | 9/2002 | Meyer |
| 2002/0152163 A1 | 10/2002 | Bezos et al. |
| 2002/0161707 A1 | 10/2002 | Cole et al. |
| 2002/0198779 A1 | 12/2002 | Rowen et al. |
| 2003/0004867 A1 | 1/2003 | Kight et al. |
| 2003/0004874 A1 | 1/2003 | Ludwig et al. |
| 2003/0050896 A1 | 3/2003 | Wiederin |
| 2003/0055783 A1 | 3/2003 | Cataline et al. |
| 2003/0069831 A1 | 4/2003 | Le et al. |
| 2003/0069842 A1 | 4/2003 | Kight et al. |
| 2003/0093367 A1 | 5/2003 | Allen-Rouman et al. |
| 2003/0105710 A1 | 6/2003 | Barbara et al. |
| 2003/0130950 A1 | 7/2003 | Ahles |
| 2003/0149662 A1 | 8/2003 | Shore |
| 2003/0154164 A1 | 8/2003 | Mascavage et al. |
| 2003/0187745 A1 | 10/2003 | Hobday et al. |
| 2003/0195843 A1 | 10/2003 | Matsuda et al. |
| 2003/0195844 A1 | 10/2003 | Hogan |
| 2003/0204457 A1 | 10/2003 | Arias |
| 2003/0208442 A1 | 11/2003 | Cockrill et al. |
| 2003/0220884 A1 | 11/2003 | Choi et al. |
| 2003/0222136 A1 | 12/2003 | Bolle et al. |
| 2003/0233318 A1 | 12/2003 | King et al. |
| 2004/0019559 A1 | 1/2004 | Moenickheim et al. |
| 2004/0019560 A1 | 1/2004 | Evans et al. |
| 2004/0049456 A1 | 3/2004 | Dreyer |
| 2004/0059672 A1 | 3/2004 | Baig et al. |
| 2004/0083167 A1 | 4/2004 | Kight |
| 2004/0083172 A1 | 4/2004 | Wiederin |
| 2004/0087339 A1 | 5/2004 | Goldthwaite et al. |
| 2004/0088243 A1 | 5/2004 | McCoy et al. |
| 2004/0088258 A1 | 5/2004 | McCoy et al. |
| 2004/0111370 A1 | 6/2004 | Saylors et al. |
| 2004/0117384 A1 | 6/2004 | Ray |
| 2004/0127256 A1 | 7/2004 | Goldthwaite et al. |
| 2004/0148252 A1 | 7/2004 | Fleishman |
| 2004/0153400 A1 | 8/2004 | Burke |
| 2004/0167823 A1 | 8/2004 | Neely et al. |
| 2004/0167853 A1 | 8/2004 | Sharma |
| 2004/0215526 A1 | 10/2004 | Luo et al. |
| 2004/0230489 A1 | 11/2004 | Goldthwaite et al. |
| 2004/0230536 A1 | 11/2004 | Fung |
| 2005/0010523 A1 | 1/2005 | Myklebust |
| 2005/0044224 A1 | 2/2005 | Jun et al. |
| 2005/0055308 A1 | 3/2005 | Meyer et al. |
| 2005/0075960 A1 | 4/2005 | Leavitt |
| 2005/0108155 A1 | 5/2005 | Gallagher et al. |
| 2005/0125342 A1 | 6/2005 | Schiff |
| 2005/0131813 A1 | 6/2005 | Gallagher et al. |
| 2005/0177510 A1 | 8/2005 | Hilt et al. |
| 2005/0187873 A1 | 8/2005 | Labrou et al. |
| 2005/0197957 A1 | 9/2005 | Keith |
| 2005/0199709 A1 | 9/2005 | Linlor |
| 2005/0203835 A1 | 9/2005 | Nhaissi |
| 2005/0222953 A1 | 10/2005 | Ganesan |
| 2005/0222954 A1 | 10/2005 | Keown et al. |
| 2005/0256802 A1 | 11/2005 | Ammermann et al. |
| 2006/0015437 A1 | 1/2006 | Kulasooriya et al. |
| 2006/0015450 A1 | 1/2006 | Guck et al. |
| 2006/0037835 A1 | 2/2006 | Doran et al. |
| 2006/0064379 A1 | 3/2006 | Doran et al. |
| 2006/0069642 A1 | 3/2006 | Doran et al. |
| 2006/0195398 A1 | 8/2006 | Dheer et al. |
| 2006/0207856 A1 | 9/2006 | Dean et al. |
| 2006/0212393 A1 | 9/2006 | Brown |
| 2006/0224467 A1* | 10/2006 | Walker et al. .................. 705/26 |
| 2006/0253340 A1 | 11/2006 | Levchin |
| 2006/0265235 A1 | 11/2006 | Schuchardt et al. |
| 2006/0265325 A1 | 11/2006 | Fajardo |
| 2007/0022052 A1 | 1/2007 | Ganesan |
| 2007/0027784 A1 | 2/2007 | Kahn et al. |
| 2007/0045395 A1 | 3/2007 | Corona et al. |
| 2007/0053518 A1 | 3/2007 | Tompkins et al. |
| 2007/0061257 A1 | 3/2007 | Neofytides et al. |
| 2007/0061258 A1 | 3/2007 | Neofytides et al. |
| 2007/0067239 A1 | 3/2007 | Dheer et al. |
| 2007/0083477 A1 | 4/2007 | Bolle et al. |
| 2007/0094113 A1 | 4/2007 | Chapeta |
| 2007/0094132 A1 | 4/2007 | Waterson et al. |
| 2007/0100748 A1 | 5/2007 | Dheer et al. |
| 2007/0125838 A1 | 6/2007 | Law et al. |

(56) References Cited

U.S. PATENT DOCUMENTS

| | | |
|---|---|---|
| 2007/0136168 A1 | 6/2007 | Dilip et al. |
| 2007/0136189 A1* | 6/2007 | German et al. .................. 705/39 |
| 2007/0198432 A1 | 8/2007 | Pitroda et al. |
| 2007/0233615 A1 | 10/2007 | Tumminaro |
| 2007/0244811 A1 | 10/2007 | Tumminaro |
| 2007/0255620 A1 | 11/2007 | Tumminaro et al. |
| 2007/0255644 A1 | 11/2007 | Elder |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro et al. |
| 2007/0265957 A1 | 11/2007 | Advani et al. |
| 2007/0265960 A1 | 11/2007 | Advani et al. |
| 2007/0288371 A1 | 12/2007 | Johnson |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0032741 A1 | 2/2008 | Tumminaro |
| 2008/0040265 A1 | 2/2008 | Rackley, III et al. |
| 2008/0046988 A1 | 2/2008 | Baharis et al. |
| 2008/0097905 A1 | 4/2008 | Neofytides et al. |
| 2008/0126136 A1 | 5/2008 | Nighan |
| 2008/0126145 A1 | 5/2008 | Rackley, III et al. |
| 2008/0133403 A1 | 6/2008 | Hamzeh |
| 2008/0133405 A1 | 6/2008 | Lyda et al. |
| 2008/0133407 A1 | 6/2008 | Guillory et al. |
| 2008/0154772 A1 | 6/2008 | Carlson |
| 2008/0167017 A1 | 7/2008 | Wentker et al. |
| 2008/0167961 A1 | 7/2008 | Wentker et al. |
| 2008/0177668 A1 | 7/2008 | Delean |
| 2008/0195510 A1 | 8/2008 | Olliphant |
| 2008/0249818 A1 | 10/2008 | Olliphant |
| 2008/0263069 A1 | 10/2008 | Harris et al. |
| 2008/0270300 A1 | 10/2008 | Jones et al. |
| 2008/0275779 A1 | 11/2008 | Lakshminarayanan |
| 2008/0288376 A1 | 11/2008 | Panthaki et al. |
| 2008/0288400 A1 | 11/2008 | Panthaki et al. |
| 2008/0288401 A1 | 11/2008 | Jones et al. |
| 2008/0312998 A1 | 12/2008 | Templeton |
| 2008/0319873 A1 | 12/2008 | Levchin et al. |
| 2008/0319874 A1 | 12/2008 | Levchin et al. |
| 2008/0319875 A1 | 12/2008 | Levchin et al. |
| 2008/0319899 A1 | 12/2008 | Levchin et al. |
| 2009/0012897 A1 | 1/2009 | Flitcroft et al. |
| 2009/0018959 A1 | 1/2009 | Doran et al. |
| 2009/0024523 A1 | 1/2009 | Baig et al. |
| 2009/0024529 A1 | 1/2009 | Baig et al. |
| 2009/0037304 A1 | 2/2009 | Matsuda et al. |
| 2009/0048967 A1 | 2/2009 | Baig et al. |
| 2009/0048974 A1 | 2/2009 | Baig et al. |
| 2009/0055282 A1 | 2/2009 | Ondeck |
| 2009/0063312 A1 | 3/2009 | Hurst |
| 2009/0070263 A1 | 3/2009 | Davis et al. |
| 2009/0089210 A1 | 4/2009 | Baig et al. |
| 2009/0089211 A1 | 4/2009 | Morse |
| 2009/0094149 A1 | 4/2009 | Baig et al. |
| 2009/0094155 A1 | 4/2009 | Baig et al. |
| 2009/0099947 A1 | 4/2009 | Boehm et al. |
| 2009/0106160 A1 | 4/2009 | Skowronek |
| 2009/0108080 A1 | 4/2009 | Meyer et al. |
| 2009/0119190 A1 | 5/2009 | Realini |
| 2009/0150284 A1 | 6/2009 | Burke |
| 2009/0157546 A1 | 6/2009 | Garcia et al. |
| 2009/0164369 A1 | 6/2009 | Fletcher |
| 2009/0216681 A1 | 8/2009 | McCown |
| 2009/0228307 A1 | 9/2009 | Sorbe |
| 2009/0276359 A1 | 11/2009 | Panthaki et al. |
| 2009/0281945 A1 | 11/2009 | Shakkarwar |
| 2009/0281951 A1 | 11/2009 | Shakkarwar |
| 2009/0287599 A1 | 11/2009 | Lamar, III |
| 2009/0319410 A1 | 12/2009 | Kight et al. |
| 2009/0319425 A1 | 12/2009 | Tumminaro et al. |
| 2009/0319638 A1 | 12/2009 | Faith et al. |
| 2009/0327128 A1 | 12/2009 | Olliphant |
| 2010/0017332 A1 | 1/2010 | Kight et al. |
| 2010/0023450 A1 | 1/2010 | Scipioni |
| 2010/0042538 A1 | 2/2010 | Dheer et al. |
| 2010/0042539 A1 | 2/2010 | Dheer et al. |
| 2010/0106623 A1* | 4/2010 | Menendez et al. .............. 705/27 |
| 2010/0257046 A1 | 10/2010 | Fu et al. |
| 2011/0213707 A1 | 9/2011 | Jackson et al. |
| 2012/0271761 A1 | 10/2012 | Kight et al. |
| 2013/0060707 A1 | 3/2013 | Kight et al. |
| 2013/0198061 A1 | 8/2013 | Dheer et al. |

FOREIGN PATENT DOCUMENTS

| | | |
|---|---|---|
| EP | 1647952 | 4/2006 |
| GB | 2392262 | 2/2004 |
| JP | 10149404 | 2/1998 |
| WO | 9719406 | 5/1997 |
| WO | 9741537 | 6/1997 |
| WO | 9910823 | 4/1999 |
| WO | 0188674 | 11/2001 |

OTHER PUBLICATIONS

Non-Final Office Action for U.S. Appl. No. 09/892,897 mailed Dec. 20, 2002.

Non-Final Office Action for U.S. Appl. No. 09/984,568 mailed Dec. 20, 2002.

Final Office Action for U.S. Appl. No. 09/892,897 mailed May 23, 2003.

Final Office Action for U.S. Appl. No. 09/984,568 mailed May 28, 2003.

Examiner's Answer for U.S. Appl. No. 09/892,897 mailed Jan. 13, 2004.

BPAI Decision for U.S. Appl. No. 09/892,897 mailed Aug. 10, 2005.

Notice of Allowance for U.S. Appl. No. 09/892,897 mailed Mar. 24 2006.

Non-Final Office Action for U.S. Appl. No. 11/348,535 mailed Dec. 31, 2007.

Final Office Action for U.S. Appl. No. 11/348,535 mailed Aug. 19, 2008.

Non-Final Office Action for U.S. Appl. No. 09/984,568 mailed Nov. 12, 2008.

Non-Final Office Action for U.S. Appl. No. 11/348,535 mailed Mar. 13, 2009.

Final Office Action for U.S. Appl. No. 11/879,818 mailed Aug. 31, 2009.

Notice of Allowance for U.S. Appl. No. 09/984,568 mailed Nov. 30, 2009.

Final Office Action for U.S. Appl. No. 11/348,535 mailed Dec. 3, 2009.

Final Office Action for U.S. Appl. No. 11/348,535 mailed Jul. 29 2010.

Non-Final Office Action for U.S. Appl. No. 12/435,393 mailed Sep. 29 2011.

Non-Final Office Action for U.S. Appl. No. 12/543,501 mailed Oct. 25 2011.

Non-Final Office Action for U.S. Appl. No. 11/348,535 mailed Nov. 3, 2011.

Non-Final Office Action for U.S. Appl. No. 12/543,497 mailed Dec. 13, 2011.

Non-Final Office Action for U.S. Appl. No. 12/714,658 mailed Mar. 23, 2012.

Non-Final Office Action for U.S. Appl. No. 12/551,249 mailed Mar. 28, 2012.

Non-Final Office Action for U.S. Appl. No. 12/435,393 mailed Jun. 12, 2012.

Non-Final Office Action for U.S. Appl. No. 12/551,253 mailed Jun. 20, 2012.

Final Office Action for U.S. Appl. No. 12/543,501 mailed Jun. 28, 2012.

(56) References Cited

OTHER PUBLICATIONS

Final Office Action for U.S. Appl. No. 12/543,497 mailed Aug. 27, 2012.
Non-Final Office Action for U.S. Appl. No. 13/092,908 mailed Aug. 13, 2012.
Notice of Allowance for U.S. Appl. No. 12/551,249 mailed Aug. 16, 2012.
Non-Final Office Action for U.S. Appl. No. 12/968,189 mailed Aug. 29, 2012.
Final Office Action mailed for U.S. Appl. No. 12/714,658 mailed Nov. 14, 2012.
Non-Final Office Action for U.S. Appl. No. 13/251,947 mailed Nov. 21, 2012.
Final Office Action for U.S. Appl. No. 12/435,393 mailed Nov. 27, 2012.
Final Office Action for U.S. Appl. No. 13/092,908 mailed Dec. 27, 2012.
Notice of Allowance for U.S. Appl. No. 12/551,253 mailed Mar. 27, 2013.
Advisory Action for U.S. Appl. No. 13/092,908 mailed Apr. 2, 2013.
Non-Final Office Action for U.S. Appl. No. 12/543,501 mailed Apr. 30, 2013.
Notice of Allowance for U.S. Appl. No. 12/551,249 mailed Jul. 23, 2013.
Notice of Allowance for U.S. Appl. No. 12/551,253 mailed Sep. 23, 2013.
Bruce Schneier Applied Cryptography Second Edition Protocols Algorithms and Source Code in C 1996 pp. 30-32.
Latest EPA Developments PR Newswire. New York: Jul 21, 2000 p. 10.
PCT International Search Report for related International Application No. PCT/US08/61620 mailed Jul. 15, 2008.
PCT International Preliminary Report on Patentability and Written Opinion for related International Application No. PCT/US08/61620 mailed Oct. 27, 2009.
European Search Report for counterpart International Application No. PCT/US08/61620 mailed Mar. 14, 2012.
Non-Final Office Action for related U.S. Appl. No. 12/109,309 mailed Apr. 15, 2009.
Final Office Action for related U.S. Appl. No. 12/109,309 mailed Dec. 31, 2009.
Non-Final Office Action for U.S. Appl. No. 12/109,318 mailed May 27, 2010.
Final Office Action for U.S. Appl. No. 12/109,318 mailed Aug. 8, 2011.
Non-Final Office Action for related U.S. Appl. No. 12/109,309 mailed Sep. 26, 2011.
Non-Final Office Action for U.S. Appl. No. 12/109,318 mailed Jan. 9, 2013.
FreshBooks Makes Invoicing All But Automatic available at http://www.smallbusinesscomputing.com/print/biztools/article.php/366701/FreshBooks, Mar. 21, 2007.
Electronic Invoicing on OB10 Network Kept 900 Trees Alive in 2006 available at http://www.ob10.com/Doc/Press/20070417%20Green%20News%20release.pdf.
170 Systems and OB10 Announce Strategic OEM Relationship to Accelerate Adoption of e-Invoicing by the Global 200, Mar. 27, 2010.
Dartmouth Research & Consulting Glossaries 2000 (pp. 1-9).
Ronan Mcivor and Paul Humphreys. "The implications of electronic B2B intermediaries for the buyer-supplier interface. " International Journal of Operations & Production Management 24.3/4 (2004): (29 pages).
Tyson David O.; "Princeton Telecom Addresses Problems of On-Line Bill Payment." Technology Today Aug. 9, 1989 vol. 154 No. 154 American Banker New York NY.
Lewis Peter H.; "Personal Computers; Managing Your Money." Aug. 29, 1989 Late Edition col. 5 p. 8 The New York Times.
Howard Bill; "The Best of 1989." PC Magazine Jan. 16, 1990 Ziff-Davis Publishing Co.

Crossman Craig; "Paying Bills Can be an Electronic Task." Miami Herald Mar. 12, 1990 Edition: Final Section: Business p. 41 BM The Miami Herald Publishing Co.
Steinberg Jeffrey A.; "CheckFree (Software Review)." MacUser Aug. 1990 v6 n8 p. 68 The Gale Group.
Shipley Chris; "I Threw Away My Checkbook." PC Computing Nov. 1990 v3 n11 p. 112-117 Ziff-Davis Publishing Company.
Shipley Chris; "Electronic Bill Paying Just Got a Lot Easier (software review)". PC Computing May 1, 1991 Ziff-Davis Publishing Company.
Magid Lawrence J. "How to Put PC to Work Paying Bills." Computer File Jul. 25, 1991 The Times Mirror Company and Los Angeles Times.
Shipley Chris "CheckFree's Payment System." PC Computing Aug. 1, 1991 Ziff-Davis Publishing Company.
Anonymous; "EFT Digest: MAC Forms Alliances with the Competition." Bank Network News Jul. 26, 1993 Faulkner & Gray Inc.
Anonymous; "Banking and Finance: China Leaps Forward in Financial Systems" Industries in Transition Jul. 1995 v23 n3 Business Communications Company Inc.
Anonymous; "Uitilities Phone Companies Pilot Electronic Billing Item Processing Report." Nov. 7, 1996 vol. 7 Issue 22 Phillips Business Information.
Anonymous; "CheckFree Delivers E-Bill." Internet Week Nov. 12, 1996 Phillips Business Information Inc.
Anonymous; "Open Financial Exchange Specification 1.0.2." Chapters 1-13 May 30, 1997 CheckFree Corp. Intuit Inc. and Microsoft Corp.
Anonymous; "Open Financial Exchange Bill Presentment." Chapter 15 Jun. 12, 1997 pp. 312-356 CheckFree Corp. Intuit Inc. and Microsoft Corp.
Anonymous; "Open Financial Exchange Specification 1.5.1." Chapters 1-15 Nov. 23, 1998 pp. 1-566 CheckFree Corp. Intuit Inc. and Microsoft Corp.
Wallace Bob; "Utilities Adopt Web Bill Payment Plans." ComputerWorld Aug. 25, 1997 pp. 51-52.
Marlin Steven; "Electronic Bill Presentment." Bank Systems & Technology Jul. 1, 1998 Information Access Company and Gralla Publications.
Magid Lawrence J. "Pay Your Bills the PC Way." St. Louis Post Dispatch Jul. 31, 1989 Edition: Five Star Section: Monday's Business Section p. 18.
Anonymous; Open Financial Exchange Specification 1.5.1 Nov. 23, 1998 pp. 61 452-453.
Advertisement "CheckFree: The fastest Way to Pay Bills and Handle Finances." As seen in PC Computing reprinted from PC Computing, 1990.
French Kristen; "Investors Worry CheckFree Being Chased from its Own Game." Market Movers Jun. 20, 2002 The Street http://www.thestreet.com.
Levine Shira; "Billing with an Attitude." America's Network Jan. 15, 1998 p. 78; Advanstar Communications Inc.
"The Biller's Guide to Electronic Consumer Bill Payment." NACHA 1995.
PCT International Search Report for related International Application No. PCT/US07/16371 mailed Sep. 24 2008.
PCT International Preliminary Report on Patentability and Written Opinion for related International Application No. PCT/US07/16371 mailed Jan. 20, 2009.
PCT International Search Report for related International Application No. PCT/US09/54237 mailed Sep. 29, 2009.
PCT International Preliminary Report on Patentability and Written Opinion for related International Application No. PCT/US09/54237 mailed Feb. 22, 2011.
PCT International Search Report for related International Application No. PCT/US09/42757 mailed Jun. 18, 2009.
PCT International Preliminary Report on Patentability and Written Opinion for related International Application No. PCT/US09/42757 mailed Jun. 18, 2009.
PCT International Search Report for related International Application No. PCT/US10/60364 mailed Mar. 7, 2011.

(56) References Cited

OTHER PUBLICATIONS

PCT International Preliminary Report on Patentability and Written Opinion for related International Application No. PCT/US10/60364 mailed Jun. 19, 2012.
PCT International Search Report for related International Application No. PCT/US11/33696 mailed Oct. 4, 2011.
PCT International Preliminary Report on Patentability and Written Opinion for related International Application No. PCT/US11/33696 mailed Oct. 23, 2012.
Non-Final Office Action for U.S. Appl. No. 13/664,124 mailed Dec. 31, 2013.
Non-Final Office Action for U.S. Appl. No. 13/747,341 mailed Feb. 27, 2014.
Non-Final Office Action for U.S. Appl. No. 12/543,501 mailed Nov. 8, 2013.
Non-Final Office Action for U.S. Appl. No. 10/769,036 mailed Dec. 10, 2013.
Non-Final Office Action for U.S. Appl. No. 13/539,241 mailed Dec. 11, 2014.
Non-Final Office Action for U.S. Appl. No. 12/435,393 mailed Dec. 27, 2013.
Final Office Action for U.S. Appl. No. 12/543,501 mailed May 21, 2014.
Non-Final Office Action for U.S. Appl. No. 12/543,497 mailed May 22, 2014.
Non-Final Office Action for U.S. Appl. No. 12/714,658 mailed Jun. 5, 2014.
Notice of Allowance for U.S. Appl. No. 13/664,124 mailed Jul. 2, 2014.

\* cited by examiner

CENTRALIZED PAYMENT METHOD AND SYSTEM FOR ONLINE AND OFFLINE TRANSACTIONS

CROSS-REFERENCE TO RELATED APPLICATIONS

This application is a continuation of and claims the benefit to U.S. Nonprovisional application Ser. No. 12/109,309, entitled "Centralized Payment Method and System for Online and Offline Transactions," filed Apr. 24, 2008, which is a nonprovisional of U.S. Provisional Application No. 60/957,634, entitled "Consolidated Shared Payment Hub," filed Aug. 23, 2007, and U.S. Provisional Application No. 60/926,619, entitled "Payment method and system for online and offline transactions," filed Apr. 27, 2007, the content of which is hereby incorporated by reference.

TECHNICAL FIELD

The invention is in the field of electronic payment methods and systems, including electronic financial networks.

BACKGROUND

Currently there are systems and methods for facilitating online transactions. FIGS. 1 and 2 illustrate one current system 100 used to facilitate making payments for online purchases. There are two categories of payment services available in such traditional systems. One category includes person-to-person and person-to-merchant payment services. The other category includes direct-to-merchant payment services. In such traditional methods, a user must open an account 104 with the service, referred to in FIGS. 1 and 2 as "X" service, and the user must fund the account. The account 104 must be funded using an external financial source 102, such as a checking account, a credit card, etc. In addition, funds must be kept on deposit in the account 104 for transfer or disbursement. The funds are transferred to the account 104 by the user with no sharing of information, such as information regarding other user accounts, or user creditors, etc. Money in the account 104 can be used for any of account services 112 offered by "X" service. Funds from the account 104 are distributed to payees 106 when the user performs a transaction that allows use of the "X" service, including payments to individuals 106A and to online stores 106B. Payment services 108 for person-to-person payments, and payment services 110 for direct-to-merchant payments are shown. Examples of such traditional services include the PayPal™ service.

However, current systems and methods for facilitating online transactions have significant limitations. FIG. 2 illustrates various limitations of the "X" service. For example, settlement time 113 for payment from the external financial source 102 to the user account 104 can be 3 to 4 days using a DDA account. When funds are transferred from the account 104 to multiple destination accounts 105, an additional 3 to 4 days settlement time is incurred in transferring the funds from the destination accounts 105 to a main bank account 117. This creates a worst-case settlement time of up to 8 days, not including any delays caused by verification processes at any transfer point.

Another disadvantage of such current systems is that the user must fund and manage the account 104 with "X" service as a separate account and relationship distinct from any other payor or payee relationships.

DETAILED DESCRIPTION

Figure 1:
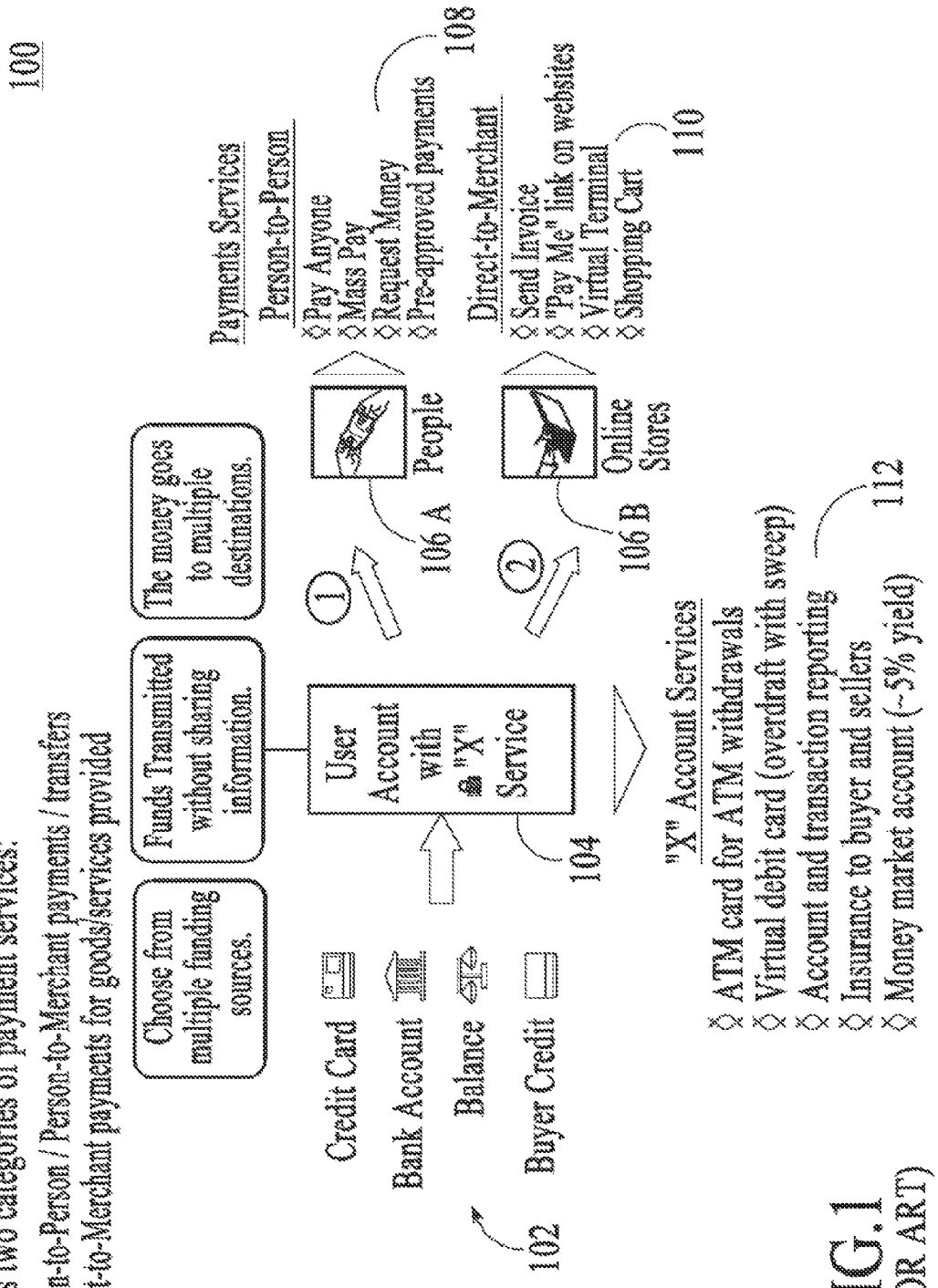
FIGS. 1 and 2 illustrate a prior art system used to facilitate making payments for online purchases.
Figure 2:
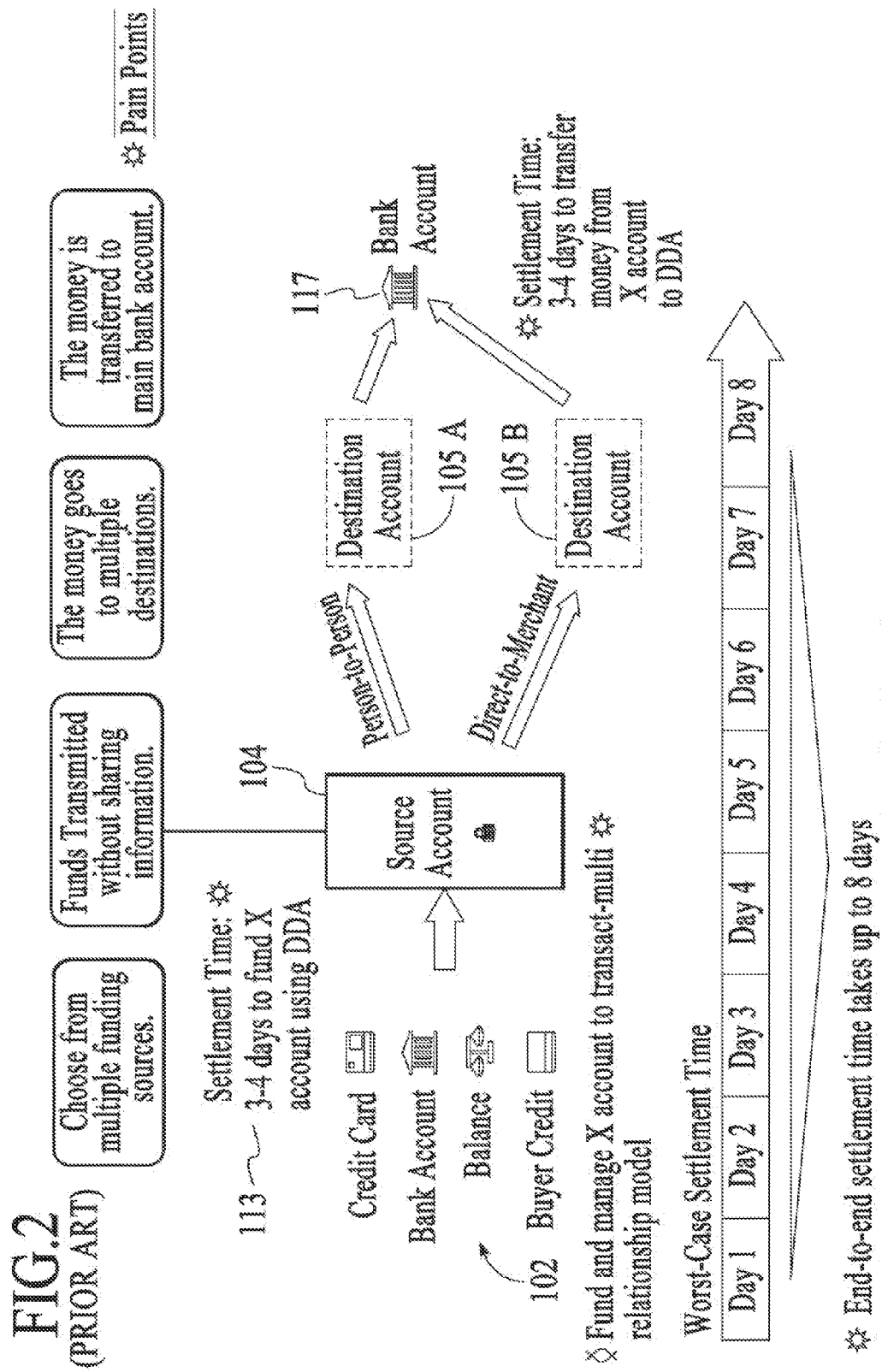

Embodiments described herein include an electronic transaction service network (also referred to herein as a centralized electronic transaction (CET) service). According to an embodiment, a financial management system hosts multiple CET web sites on behalf of multiple merchants. All transactions through any CET web site are executed and managed by the financial management system. Merchants may customize their web sites to include a branded look and feel. The merchant web sites are part of a CET service for which customer can register. Registered customers can then view and pay invoices from any merchants having CET web sites, whether purchases were made online or offline. Customers specify preferences for the CET service including choosing existing customer accounts from which the financial management system is to pay invoices on behalf of the customer. This eliminates the need for the customer to open and fund a separate payment account as in traditional methods.

The financial management system handles all transactions and data storage on behalf of merchants. Embodiments leverage existing financial institution (FI) payor and merchant networks. This allows merchants who are not large enough to provide online payment through conventional systems to have convenient online invoicing and payment services to offer their customers. This also allows customers of the financial management system to easily pay many different merchants online using a customer's existing account (such as a checking account, savings account, or credit card). Embodiments do not require a user to create, fund and maintain a separate account for the purpose of payment services. In an embodiment, a user or customer registers with the transaction CET service. The user is not required to create, fund and maintain a separate account in order to use the CET service. The term "user" and "customer" will be used interchangeably herein.

According to various embodiments, individuals who are "unbanked" (e.g., individuals who have no access to checking accounts, credit cards or other convenient non-cash payment mechanisms) may register with the CET service, and transact with online and offline merchants and make online payments.

One possible implementation of the CET service is by a small business that is part of the CET service. The business can create an invoice and send the invoice out to the customer, by mail or electronically. The customer, who is registered with the CET service, can access the invoice electronically, and automatically pay that invoice, for example through the customer's bank account.

Accounts payable can also be managed using the CET service. For example, consider a business that maintains a running account with a particular vendor. The business does not receive an invoice from the vendor, but can login to the CET service, view the account balance, and electronically pay the balance from another financial account of the business. The financial information does not need to be shared between the two entities.

Another functionality according to an embodiment is payroll management. For example, the business can login to the CET service and view payroll information. For employees who are also registered with the CET service, the business can pay the employee electronically from the business's financial account at a financial institution to the employee's chosen account at a (probably, but not necessarily, different) financial institution.

One embodiment of the CET service includes a branded biller-direct site. In contrast to previous methods, in which a customer or user logs into an "X" service web site, a biller-direct web site exists for the merchant or business. The business has the ability to customize the look and feel of this web site, which may be branded by the merchant or co-branded with the CET service. In an embodiment, there is a direct link to the (branded or co-branded) CET service web site from the business web site. An invoice, an email or some other communication is sent from the business to the customer with an indication that the required payment can be made directly on the business's CET service web site (the link to the web site is provided). The link takes the customer to the branded web site. In an embodiment, the web site includes the icon of the business and a CET service icon.

Co-branding embodiments include cross-sell opportunities. For example, the consumer logging on to view a merchant invoice can be provided with information regarding promotions and discounts of the merchant. In addition, a business logging on to view its account information can be provided with information regarding network services.

In various embodiments, the CET service can be accessed in a variety of ways. For example, the user can login to the CET service web site and view the account information available for the user. The account information available for the user includes information related to all of the businesses with which the user has accounts that are also registered with the CET service. When the user clicks on an invoice of a particular business, a detail window with the invoice information also displays the branding of the invoicing business, as well as any cross-sell messaging provided by the invoicing business. Alternatively, the user can login to a business web site and view the user's account information for that particular business (e.g., via a link as previously described).

Businesses participating in the CET service may access various information when logged into the CET service web site. For example, all accounts receivable information for those customers participating in the CET service is visible. In addition, accounts payable information is also visible for those vendors participating in the CET service. Thus, a consolidated view of accounts, both receivable and payable, is available to the business participant. In addition, businesses can also leverage the service to make point of sales payments associated with an online shopping cart.

Non-business users can perform various functions when logged into the CET service. For example, the user can view the invoices placed there by a business, the user can pay invoices directly using the CET service, and the user can view a consolidated statement that includes payment history. Users can also leverage the service to make point of sale payments associated with a merchant shopping cart.

According to an embodiment, even if invoices are received offline, a user may still use the CET service web site to pay directly because the merchant or business knows the user and is aware of the relationship and account status. The web site can be used to remit the payment directly to the merchant account.

An existing user bank account is used to fund transactions according to the CET service. This is in contrast to having to create, fund and maintain a separate "X" service account as in existing payment methods and systems.

According to embodiments, the CET service offers rewards and other loyalty programs to users for participation in the CET service (e.g., for registering and completing transactions using the CET service). The rewards can be redeemed for goods, services, discounts, etc. This is in contrast to existing payment methods and systems, which do not make rewards available.

Figure 3:
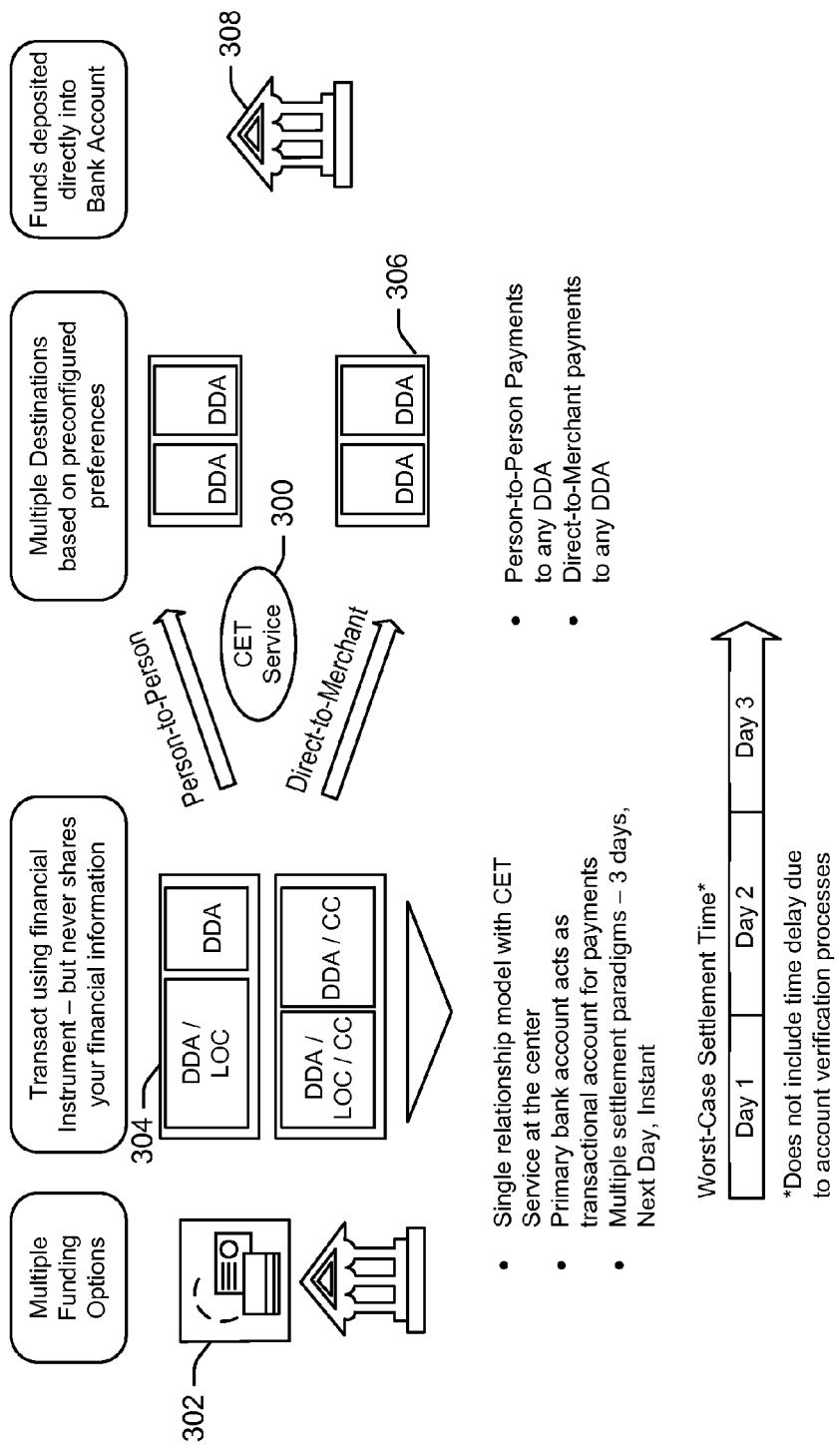
FIG. 3 is a block diagram illustrating an embodiment of a centralized electronic transaction (CET) service, which provides improved settlement time over existing payment methods, according to an embodiment.

FIG. 3 is a block diagram illustrating an embodiment of a CET service 300, including improved settlement time over existing payment methods, according to an embodiment. There is a single relationship model with the CET service; a user does not have to maintain a relationship and financial account with a separate payment service entity. Instead, the user selects among multiple funding options 302 including existing user bank accounts and credit cards. This provides several advantages. Because the primary account 302 designated by the user acts as the transactional account for the CET service, expanded capabilities of the primary account 302 are seamlessly available. For example, multiple transaction types are executed dependent only on the various channels used by the bank account/financial institution. This includes multiple payment paradigms, such as 3-day settlement, next-day settlement, and instant settlement. The CET service executes transactions using the primary account 302 (financial instruments, including DDAs and credit cards (CCs)) as shown at 304, but the user financial information is never shared with anyone, including the merchant or person being paid. The CET service enables the primary account 302 to be used for person-to-person payments, direct-to-merchant payments (as shown at 306), and any other type of transaction the user has available through the primary account 302. The funds from the primary account 302 are deposited directly in the bank account 308 of the person or merchant being paid.

Aspects of the CET service 300 and advantages thereof as described herein are particularly useful for a large financial institution desiring to incorporate the CET service in it offerings. However embodiments are not so limited. Embodiments of the CET service may be tailored as a stand-alone application or as an application tailored to be presented as a service of a particular large or small entity.

Table 1 below lists some of the market opportunities in the area of both online payments and other areas, such as serving the unbanked.

TABLE 1

| OPPORTUNITY | | FEATURES |
|---|---|---|
| ONLINE PAYMENTS | Serving Online Businesses Provide easy-to-use and holistic electronic payment and merchant acquiring services to retail consumers and hobbyists with a special focus on online merchants | Transact using primary DDA/Card Online Direct-to-Merchant payments Online Person-to-Person payments Online invoicing and collection (ACH/Card) Consolidated Reporting |
| | Serving Offline Businesses Leveraging a large base of customers built in an adjacent business (Retail, Card, Merchant Services, etc.) to build a network of currently underserved offline merchants and non profit organizations | Online invoicing and collection (ACH/Card) Biller Direct for small merchants Consolidated Reporting Remote Deposit Capture Call Center Payments |
| OTHER | Add on Capability - Serving the Unbanked Leveraging an emerging brand and ATM/Branch Networks to target the Unbanked | Direct-to-Merchant and Person-to-Person payments via ATM/Banking Center |

Table 2 below lists some of the services offered to consumers (also referred to as users or customers herein) and to merchants according to various embodiments.

TABLE 2

| CONSUMERS | MERCHANTS |
|---|---|
| Transact using primary DDA/CARD Online Direct-to-Merchant payments Online Person-to-Person payments Consolidated Reporting across multiple financial relationships (payments and requests for payment) Privacy and security - Banking information is not shared with merchants | Receive payments from Card and DDA without merchant acquiring relationship Online invoicing and collection (ACH/Card) For offline merchants, establish biller direct website Manage accounts payable Consolidated Reporting across multiple financial relationships (payables and receivables) Other banking services, Remote Deposit Capture sweeps, etc. |

Figure 4:
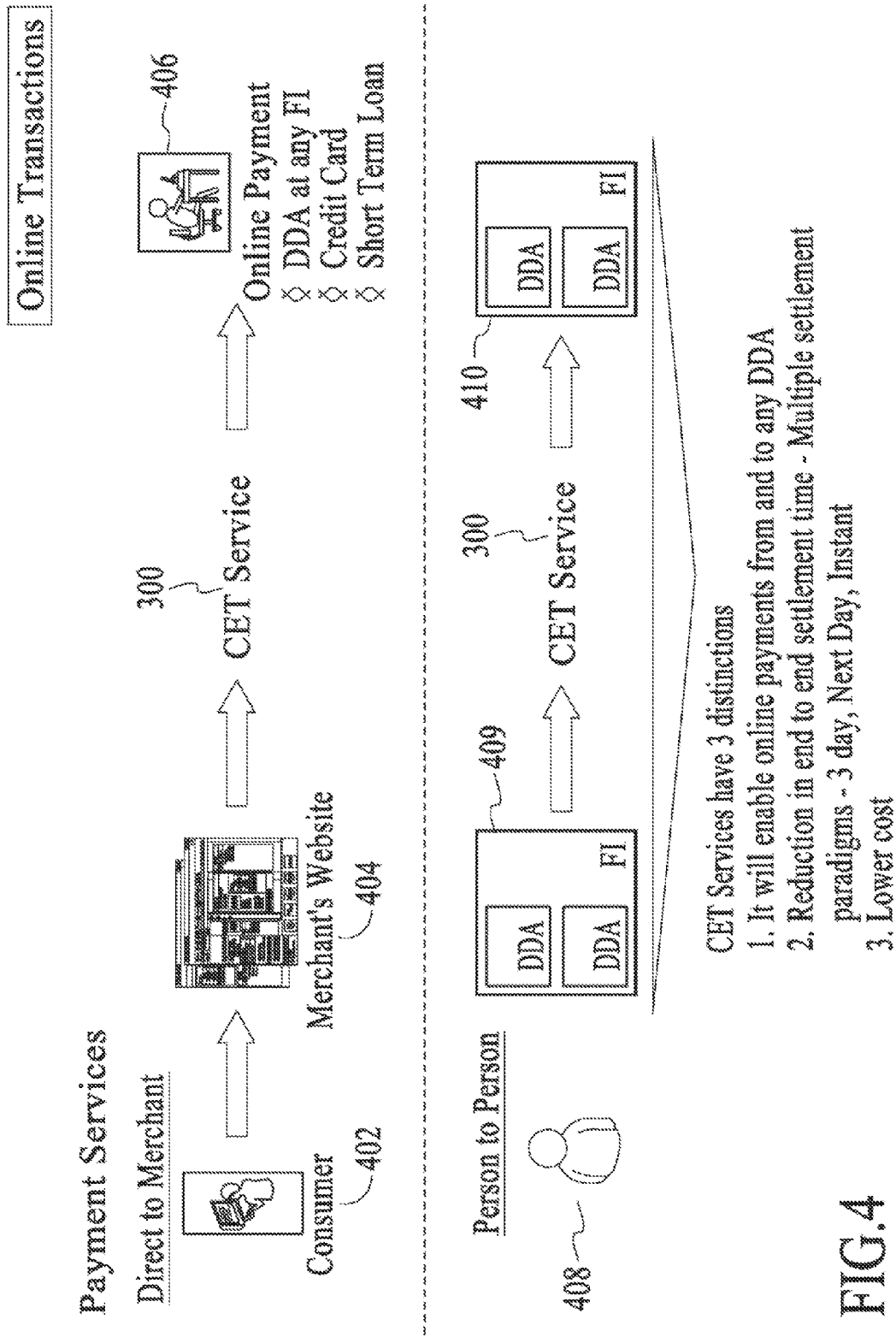
FIG. 4 is a block diagram further illustrating direct-to-merchant payment CET services and person-to-person payment CET services, according to an embodiment.

FIG. 4 is a block diagram further illustrating direct-to-merchant payment CET services and person-to-person payment CET services, according to an embodiment. In a direct-to-merchant scenario, a consumer (also referred to as a customer or user) 402 accesses a merchant web site 404. As further described below, the merchant web site 404 is hosted by a financial management system that provides the CET service to many users and merchants, thus making it possible for small merchants or individual payees or billers to offer online payment. The CET service 300 actually receives user input from the web site 404 and executes transactions accordingly. For example, the CET service 300 performs online payment 406 as specified by the user 402 including DDA account payments at any financial institution, credit card payments, and short term loans.

In a person-to-person scenario, a user (also referred to as a customer or a consumer) 408 accesses a DDA, for example through the web site of the financial institution 409 at which the DDA resides. The CET service 300 actually receives user input from the financial institution 409 and executes transactions accordingly. For example, the CET service 300 performs online payment as specified by the user 408 to one or more DDAs at another (payee) financial institution 410.

Figure 5:
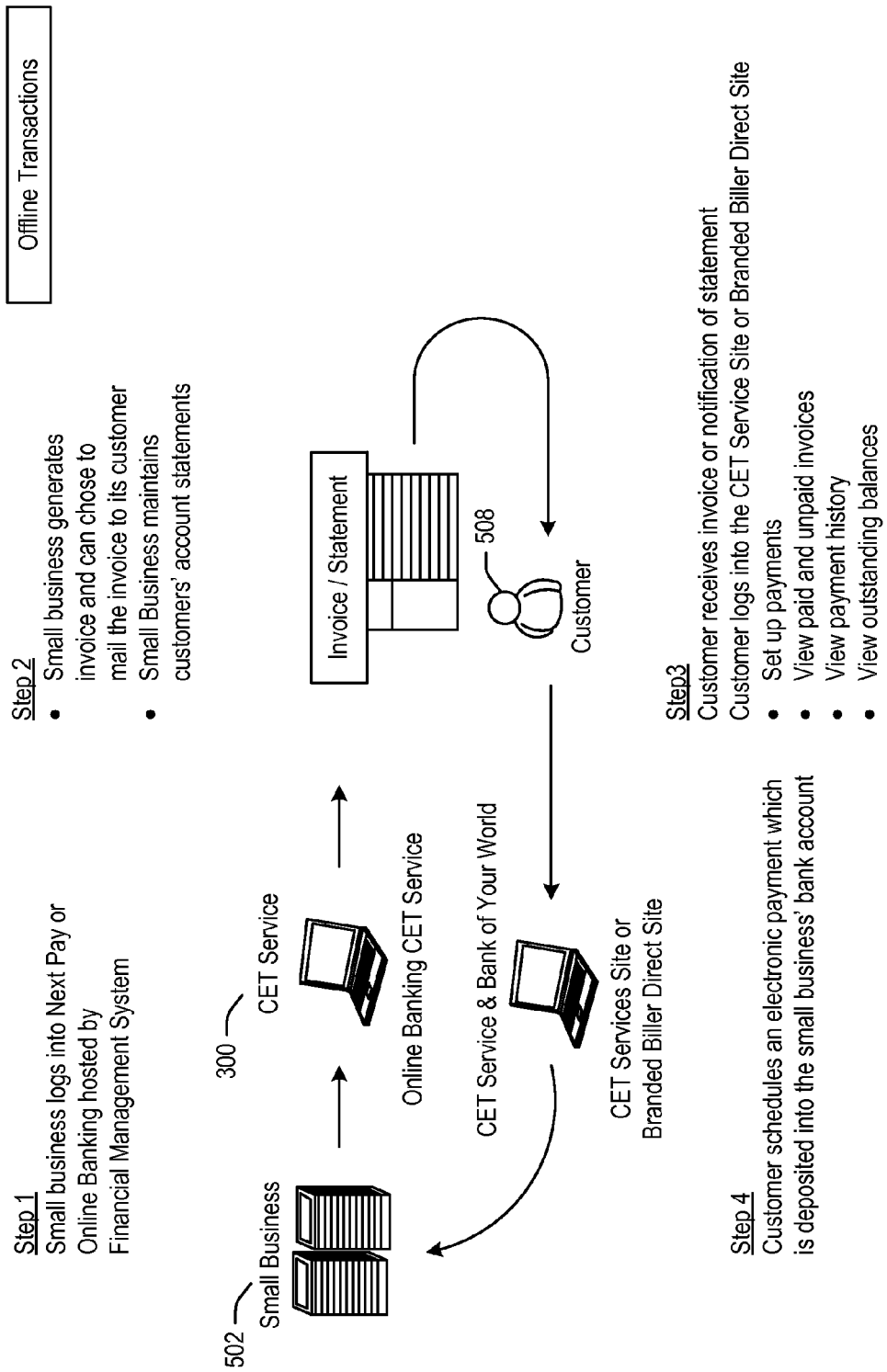
FIG. 5 is a block diagram illustrating biller-direct invoicing for offline merchants, according to an embodiment.

FIG. 5 is a block diagram illustrating biller-direct invoicing for offline merchants, according to an embodiment. A small business 502 communicates via a network (such as the Internet, a wide area network (WAN), etc.) with the CET service 300. The CET service 300 generates invoices or statements according to previously specified preferences of the small business 502. A customer 508 receives the invoice 506 via mail, in this case (the invoice could also be sent via email or another method). The customer 508 utilizes a user device 504 to log into either a central CET service web site presented by the financial management system that hosts the CET service, or a branded biller-direct web site. On either web site the customer 508 can set up payments, view paid and unpaid invoices, view payment history, and view outstanding balances. The customer 508 can schedule electronic payment of any invoices. The CET service executes transactions necessary to pay the invoice including depositing funds from an existing customer account directly into an account designated by the small business 502.

The online capability to pay invoices received offline provides convenience to the customer, reduces payables processing cost for the customer, and makes payment time shorter. For small businesses, this capability reduces the time-to-pay and days outstanding. The capability also allows small businesses to automatically reconcile receivables, and reduce receivables processing costs. For financial institutions, this capability can be offered as a value-added service to small businesses. Financial institutions can realize subscription and transaction fee revenue for providing the service.

Figure 6:
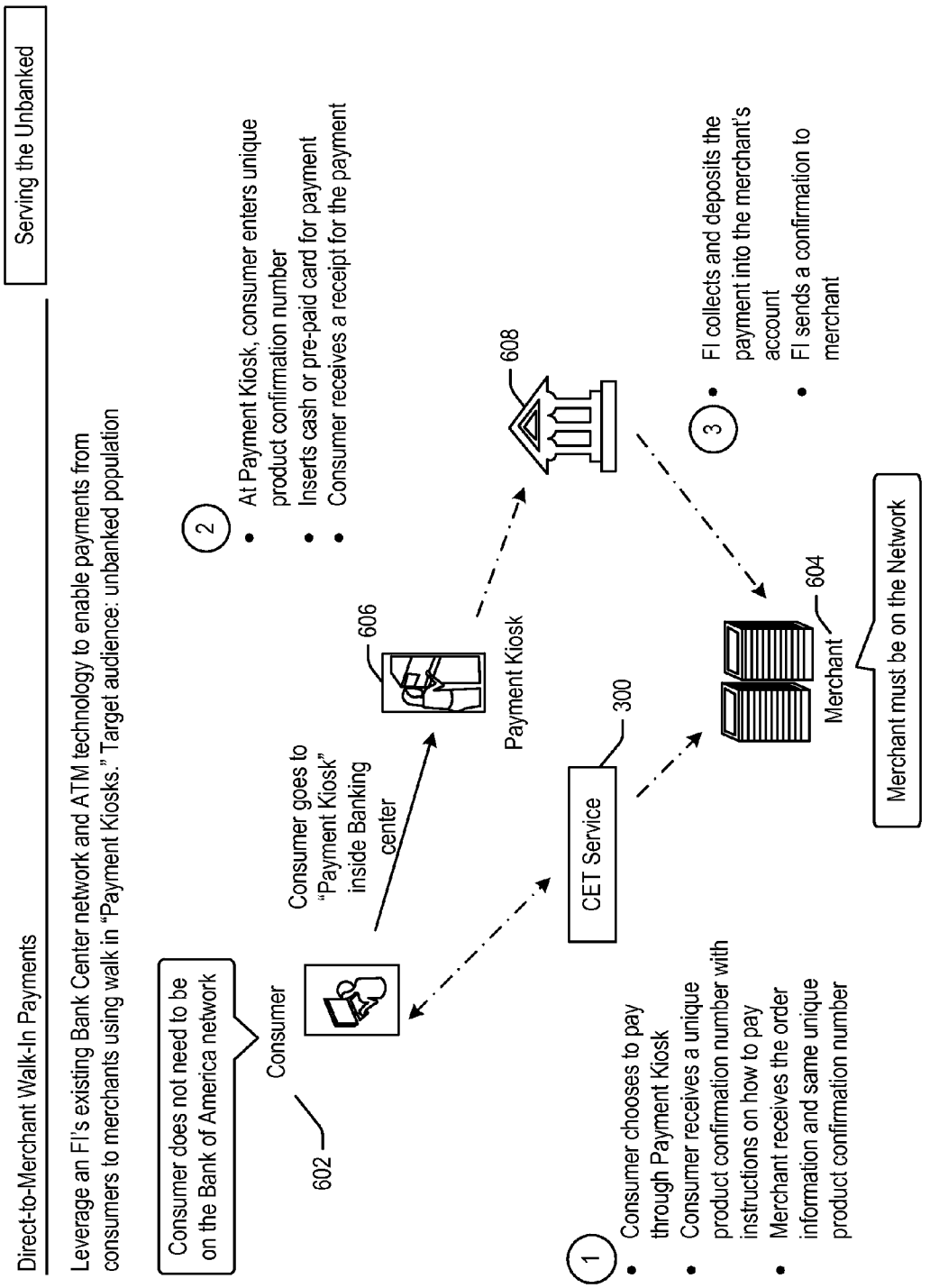
FIG. 6 is a block diagram illustrating an embodiment in which the CET service and network is used by the "unbanked" to conduct transactions, according to an embodiment.

FIG. 6 is a block diagram illustrating an embodiment in which the CET service and network is used by the "unbanked" to conduct transactions, according to an embodiment. The unbanked include individuals that have no way of making electronic payments. The unbanked must currently go to the U.S. Post Office or Western Union and obtain a money order or moneygram in order to make payments. This is an opportunity for financial institutions to use their ATM/branch networks to allow these unbanked consumers to transact offline for goods and services provided online. In an example, a consumer 602 shops online at a merchant 604 and chooses to pay using a payment kiosk 606 which is via the CET service 300 or the bank itself (such as bank 608). The consumer 602 receives a unique confirmation number and instructions to pay. The merchant 604 receives the order and has the unique confirmation number. The consumer 602 goes to a payment kiosk 606 at a banking center. The consumer 602 uses the confirmation number. Once the confirmation number is received it links the payment to the order. The consumer 602 can then select to deposit the funds directly. Some ATMs have the capability to scan cash in. The consumer 602 can also choose to walk up to a teller at the bank 608 and make the payment. The bank 608 receives the payment on behalf of the merchant 604. This service enables the unbanked population to make quicker payments. This also facilitates much faster delivery of the product to the consumer 602. There can be a transaction fee associated with the service.

The CET service 300 can thus be very valuable to the unbanked consumer who is enabled to make online purchases using cash or prepaid cards. Merchants also benefit because they can receive electronic payments from either banked or unbanked customers, expanding the customer base of the merchant. Financial institutions benefit by collecting transaction fee revenue. In addition, financial institutions have the ability to cross-sell other products or services to unbanked customers.

Figure 7:
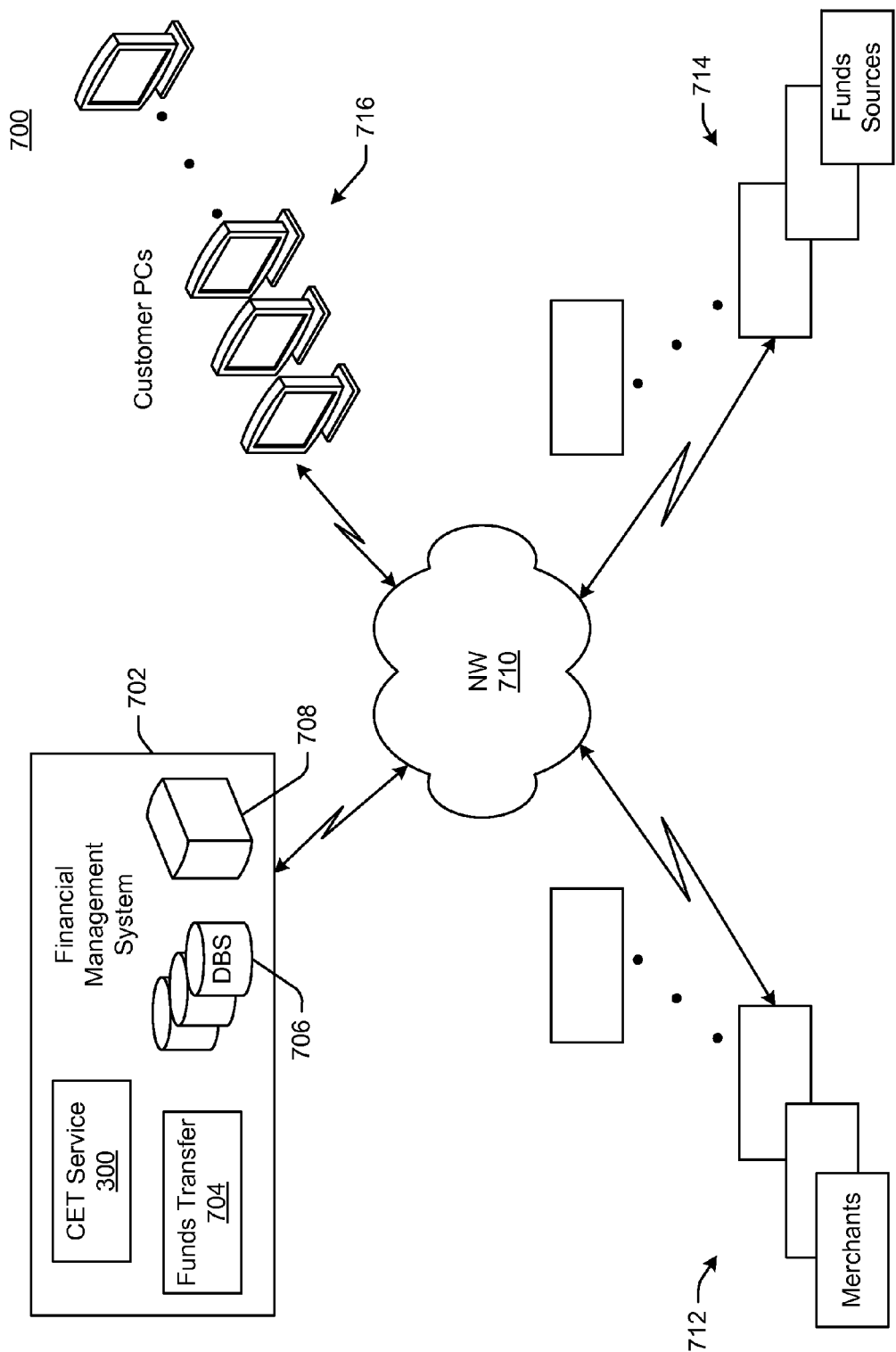
FIG. 7 is a block diagram of a system including a financial management system providing a CET system, according to an embodiment.

FIG. 7 is a block diagram of a system 700 including a financial management system 702, according to an embodiment. The system 700 includes various entities in communication with each other via a network 710, which is typically the Internet, but embodiments are not so limited. The financial management system 702 includes databases 706 that store financial institution information, user information, merchant information (including merchant preferences for individual biller-direct web sites, invoice information for merchants, etc.). The CET service 300 is included in the financial management system 702 and interoperates with a funds transfer module 704. The funds transfer module 704 communicates with multiple financial institutions to transfer funds as further described below. Servers 708 host multiple web sites and applications as described herein, including biller-direct web sites, at least one central CET service web site, invoicing applications, email applications, and setup applications, to name a few.

Merchants 712 communicate with the financial management system 702 as further described below for providing the CET service 300 to its customers, either through biller-direct web sites or through a central CET services web site. CET customer personal computers (PCs) 716 are an example of an interface between customers and the CET service 300. Customers may interface with the CET service 300 using other means, such as handheld devices, kiosks, etc. Funds sources 714 include financial institutions of all types that can transfer funds via the network 710 using established financial networks such as ATM, ACH, and debit networks.

Figure 8:
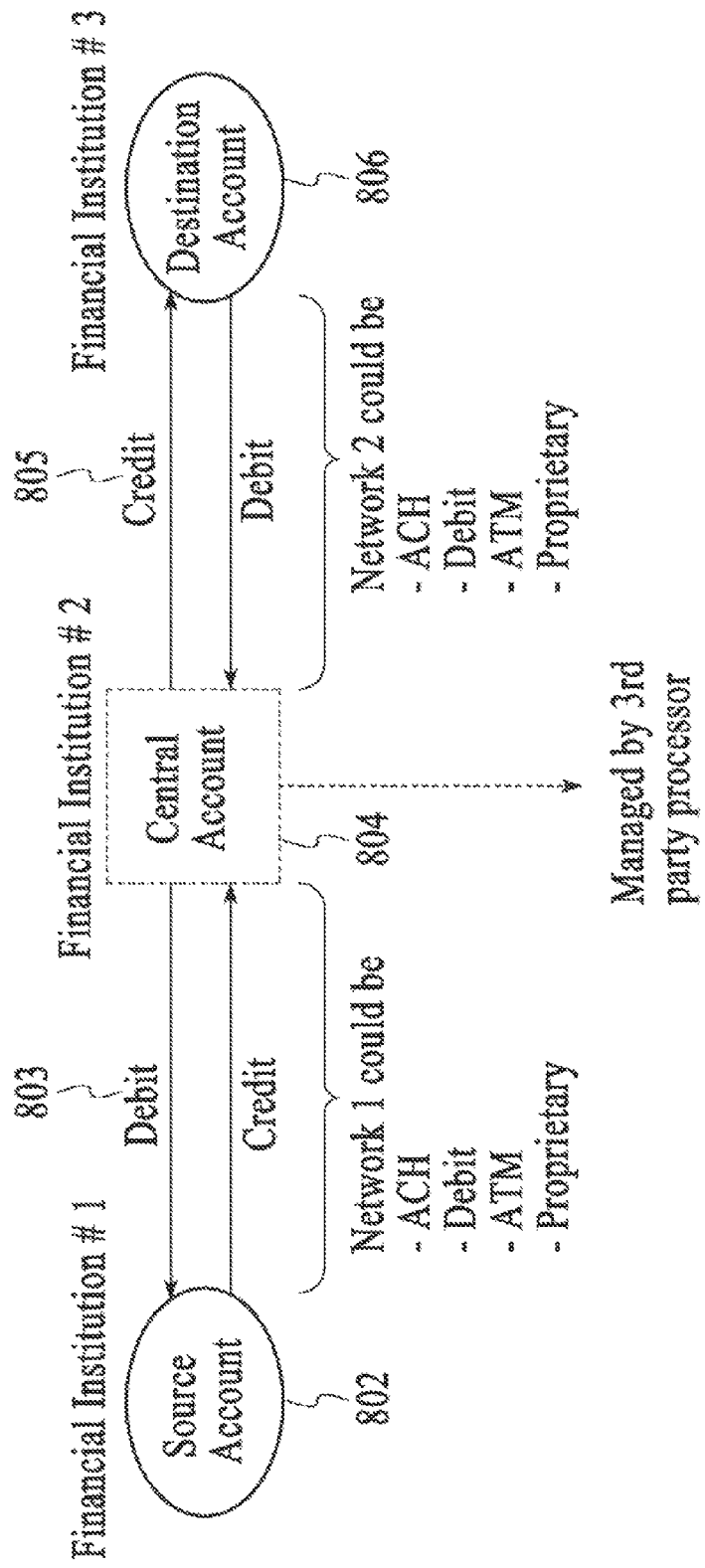
FIG. 8 is a block diagram illustrating the operation of a funds transfer module, according to an embodiment.

FIG. 8 is a block diagram illustrating the operation of the funds transfer module 704, according to an embodiment. Financial institution #2 is for the benefit of the funds transfer module 704, and in an embodiment is managed by a third party processor. In this instance "third party" infers that financial institution #2 is separate and independent from financial institution #1 and financial institution #3. In order to transfer funds from a source account 802 (for example a customer account) to a destination account 806 (such as a merchant account), the funds transfer module 704 first executes a debit transaction 803 with the source account 802. Then the funds from the first debit transaction are deposited in the central (or intermediate) account 804 in a first credit transaction.

The funds are then withdrawn from the central account 804 in a second debit transaction, and deposited in destination account 806 in a second credit transaction 805. Financial institutions #1 and #3 have no knowledge of central account 804. This is in contrast to conventional electronic funds transfers in which the financial institution providing the funds and the financial institution receiving the funds must deal directly with each other and have particular information or data about each other in order to complete the transaction. As shown, the debit and credit transactions can be accomplished using any one of various existing networks, including but not limited to an ACH network, a debit network, and an ATM network.

Figure 9:
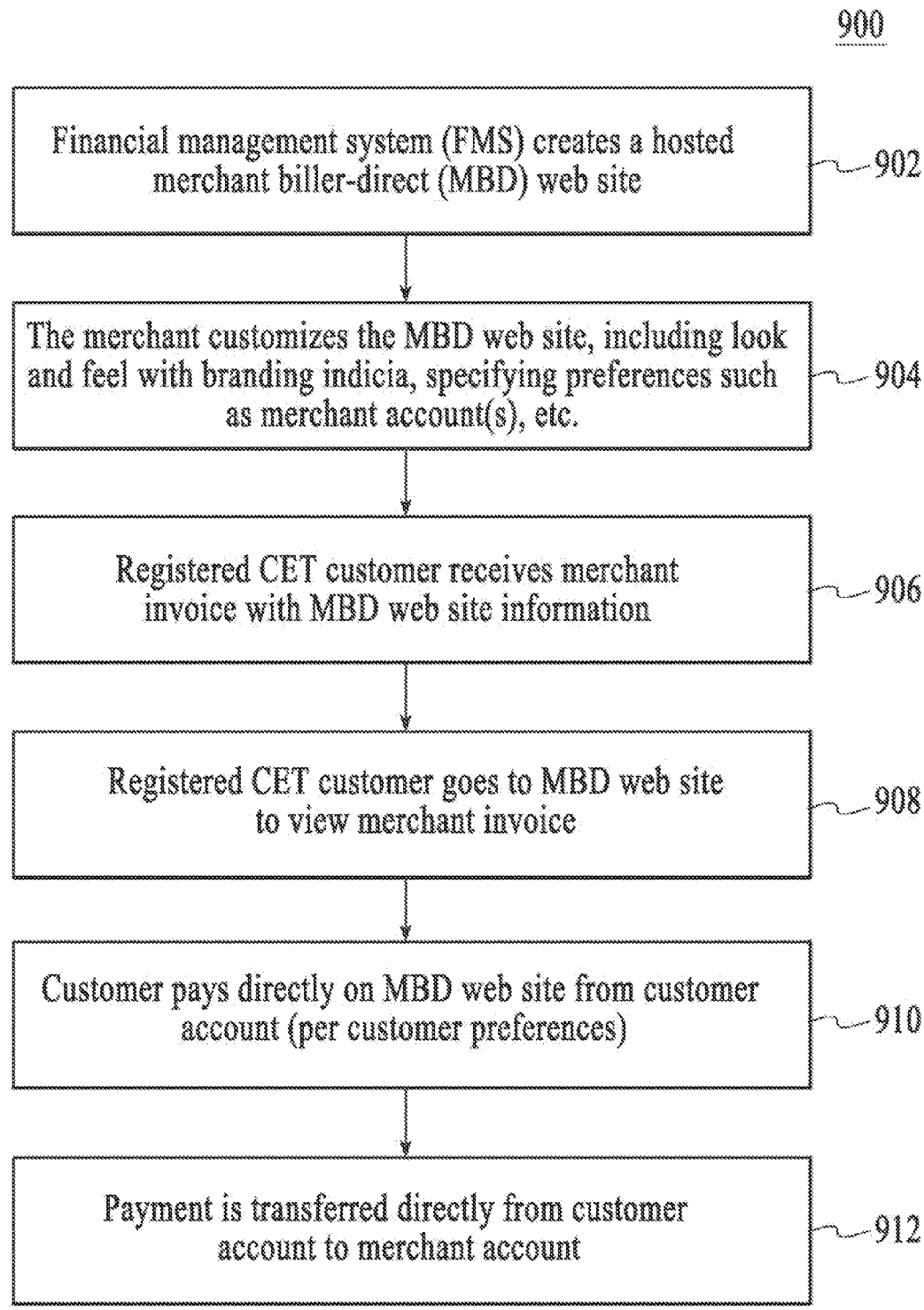
FIG. 9 is a flow chart illustrating a CET service process, according to an embodiment.

FIG. 9 is a flow chart illustrating a CET service process 900, according to an embodiment. The financial management system (FMS) creates a hosted merchant biller-direct (MBD) web site at 902. At 904, the merchant customizes the MBD web site, including look and feel with branding indicia, specifying preferences such as merchant account(s), etc. A registered CET customer receives a merchant invoice with MBD web site information (usually a link to the MBD web site) as shown at 906. The registered CET customer goes to the MBD web site to view the merchant invoice at 908. At 910, the customer pays directly on the MBD web site from a customer account (chosen previously per customer preferences). Payment is transferred directly from the customer account to the merchant account at 912.

Figure 10:
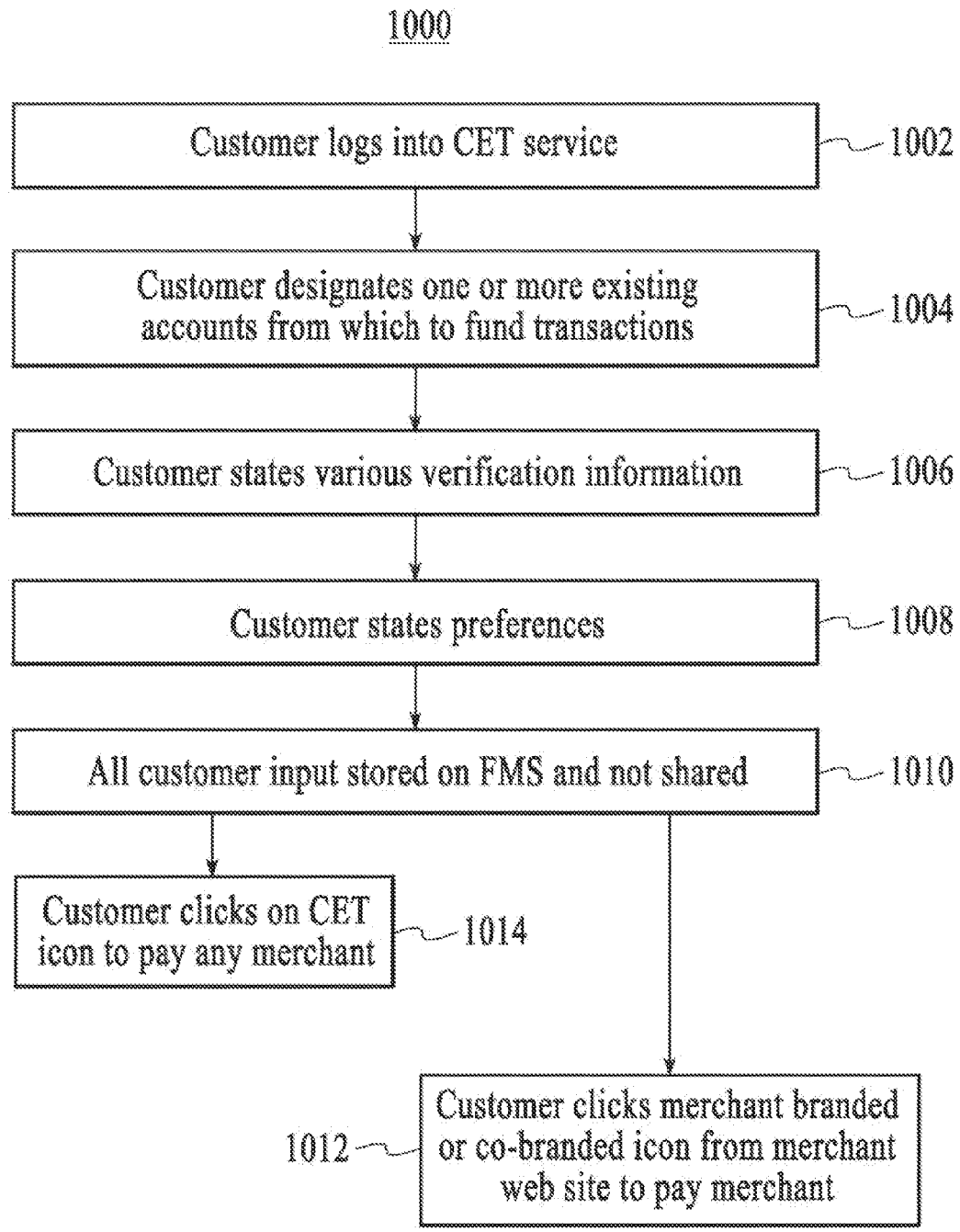
FIG. 10 is a flow chart illustrating a CET service process of registering a user, according to an embodiment.

FIG. 10 is a flow chart illustrating a CET service process 1000 of registering a user, according to an embodiment. A customer logs into the CET service at 1002. The customer designates one or more existing accounts from which to fund transactions at 1004. At 1006, the customer states various verification information, such as user names, passwords, personal identification information, etc. The customer states preferences at 1008, such as how the customer would like to receive invoices. All of the customer input is stored on the financial management system and not shared with other entities, including financial institutions, as shown at 1010. The registered customer can then access and use the CET service by clicking on a CET icon to pay any merchant that also uses the CET service at 1014. In addition, or alternatively, the registered user can then click on a branded or co-branded icon from a merchant web site to pay the specific merchant at 1012.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventors contemplate the various aspects of the systems and methods in any number of claim forms. For example, while only one aspect of the systems and methods may be recited as embodied in machine-readable medium, other aspects may likewise be embodied in machine-readable medium. Accordingly, the inventors reserve the right to add additional claims after filing the application to pursue such additional claim forms for other aspects of the systems and methods.

What is claimed is:

1. A system, comprising:
   at least one memory storing computer-executable instructions; and
   at least one processor configured to access the at least one memory and to execute the computer-executable instructions to:
   receive an indication of a request by an unbanked consumer to submit a payment for an online purchase of at least one good or service from a merchant via an offline mechanism that is independent from an online mechanism via which the online purchase is made;
   identify a confirmation number that uniquely identifies an order associated with the online purchase;
   transmit, for presentation to the unbanked consumer, the confirmation number and payment instructions, wherein the payment instructions comprise instructions for submitting the payment and the confirmation number via the offline mechanism, wherein the offline mechanism comprises one of: i) an ATM of a financial institution, ii) a payment kiosk of the financial institution or iii) a teller of the financial institution, and wherein the payment is linked to the order based at least in part on the confirmation number; and
   transmit the confirmation number to the merchant.

2. The system of claim 1, wherein the payment comprises one of (i) a cash payment or (ii) a pre-paid card payment.

3. The system of claim 1, wherein a transaction fee is assessed by the financial institution in connection with the payment.

4. The system of claim 1, wherein the at least one processor is further configured to execute the computer-executable instructions to:
   receive the confirmation number and an indication of the payment;
   direct a credit to the merchant for the online purchase responsive to receipt of the confirmation number; and
   transmit a confirmation of payment for the purchase to the merchant.

5. The system of claim 4, wherein the credit is an electronic credit.

6. A method, comprising:
   receiving, by a computerized financial system comprising one or more computers, an indication of a request by an unbanked consumer to submit a payment for an online purchase of at least one good or service from a merchant via an offline mechanism that is independent from an online mechanism via which the online purchase is made;
   identifying, by the computerized financial system, a confirmation number that uniquely identifies an order associated with the online purchase;
   transmitting, by the computerized financial system for presentation to the unbanked consumer, the confirmation number and payment instructions, wherein the payment instructions comprise instructions for submitting the payment and the confirmation number via the offline mechanism, wherein the offline mechanism comprises one of: i) an ATM of a financial institution, ii) a payment kiosk of the financial institution or iii) a teller of the financial institution, and wherein the payment is linked to the order based at least in part on the confirmation number; and
   transmitting, by the computerized financial system to the merchant, the confirmation number.

7. The method of claim 6, wherein the payment comprises one of (i) a cash payment or (ii) a pre-paid card payment.

8. The method of claim 6, wherein a transaction fee is assessed by the financial institution in connection with the payment.

9. The method of claim 6, further comprising:
   receiving, by the computerized financial system, the confirmation number and an indication of the payment;
   directing, by the computerized financial system responsive to receiving the confirmation number, a credit to the merchant for the online purchase; and
   transmitting, by the computerized financial system to the merchant, a confirmation of payment for the purchase.

10. The method of claim 9, wherein the credit is an electronic credit.

11. A financial system associated with a financial institution, the financial system comprising:
    at least one memory storing computer-executable instructions; and
    at least one processor configured to access the at least one memory and to execute the computer-executable instructions to:
    receive i) an indication of a payment received from an unbanked consumer for an online purchase of at least one good or service from a merchant, wherein the payment is received via an offline mechanism that is independent from an online mechanism via which the online purchase is made and ii) a confirmation number received from the unbanked consumer via the offline mechanism, wherein the offline mechanism comprises one of: i) an ATM of the financial institution, ii) a payment kiosk of the financial institution, or iii) a teller of the financial institution, wherein the confirmation number uniquely identifies an order associated with the online purchase, and wherein the payment is linked to the order based at least in part on the confirmation number;

generate a receipt for the payment responsive to receiving the indication of the payment and the confirmation number;

transmit the receipt for the payment for presentation to the unbanked consumer via the offline mechanism;

initiate a credit to the merchant for the online purchase responsive to receiving the indication of the payment and the confirmation number; and initiate transmission of a confirmation of the payment to the merchant.

12. The financial system of claim 11, wherein the payment comprises one of (i) a cash payment or (ii) a pre-paid card payment.

13. The financial system of claim 11, wherein the at least one processor is further configured to execute the computer-executable instructions to:
assess a transaction fee in connection with the payment.

14. The financial system of claim 11, wherein the credit is an electronic credit.

15. The financial system of claim 11, wherein the at least one processor is further configured to execute the computer-executable instructions to:
transmit, for presentation to the unbanked consumer via the offline mechanism, an offer for one or more financial products or services.

16. A method, comprising:
receiving, by a computerized financial system associated with a financial institution and comprising one or more computers, i) an indication of a payment received from an unbanked consumer for an online purchase of at least one good or service from a merchant, wherein the payment is received via an offline mechanism that is independent from an online mechanism via which the online purchase is made and ii) a confirmation number received from the unbanked consumer via the offline mechanism, wherein the offline mechanism comprises one of: i) an ATM of the financial institution, ii) a payment kiosk of the financial institution, or iii) a teller of the financial institution, wherein the confirmation number uniquely identifies an order associated with the online purchase, and wherein the payment is linked to the order based at least in part on the confirmation number;

generating, by the financial system responsive to receiving the indication of the payment and the confirmation number, a receipt for the payment;

transmitting, by the financial system, the receipt for the payment for presentation to the unbanked consumer via the offline mechanism;

initiating, by the financial system responsive to receiving the indication of the payment and the confirmation number, a credit to the merchant for the online purchase; and initiating, by the financial system, transmission of a confirmation of the payment to the merchant.

17. The method of claim 16, wherein the payment comprises one of (i) a cash payment or (ii) a pre-paid card payment.

18. The method of claim 16, further comprising:
assessing, by the computerized financial system, a transaction fee in connection with the payment.

19. The method of claim 16, wherein the credit is an electronic credit.

20. The method of claim 16, further comprising:
transmitting, by the computerized financial system for presentation to the unbanked consumer via the offline mechanism, an offer for one or more financial products or services.

21. A merchant system associated with a merchant, the merchant system comprising:
at least one memory storing computer-executable instructions; and
at least one processor configured to access the at least one memory and to execute the computer-executable instructions to:
receive an order associated with an online purchase by an unbanked consumer of at least one good or service from the merchant;
receive a confirmation number that uniquely identifies the order; and
receive a confirmation that a payment for the online purchase has been received from the unbanked consumer via an offline mechanism that is independent from an online mechanism via which the online purchase is made, wherein the offline mechanism comprises one of: i) an ATM of a financial institution, ii) a payment kiosk of the financial institution or iii) a teller of the financial institution, and wherein the payment is linked to the order based at least in part on the confirmation number.

22. The merchant system of claim 21, wherein the at least one processor is further configured to execute the computer-executable instructions to:
receive, on behalf of the unbanked consumer, a request to submit the payment via the offline mechanism; and
transmit an indication of the request to a financial system, wherein the confirmation number is received from the financial system responsive to transmitting the indication of the request to the financial system.

23. The merchant system of claim 21, wherein the order is received from the financial system.

24. The merchant system of claim 21, wherein at least one processor is further configured to execute the computer-executable instructions to:
receive an electronic credit responsive to receipt of the payment from the unbanked customer via the offline mechanism.

25. A method, comprising:
receiving, by a computerized merchant system associated with a merchant and comprising one or more computers, an order associated with an online purchase by an unbanked consumer of at least one good or service from the merchant;
receiving, by the computerized merchant system, a confirmation number that uniquely identifies the order; and
receiving, by the computerized merchant system, a confirmation that a payment for the online purchase has been received from the unbanked consumer via an offline mechanism that is independent from an online mechanism via which the online purchase is made, wherein the offline mechanism comprises one of: i) an ATM of a financial institution, ii) a payment kiosk of the financial institution or iii) a teller of the financial institution, and wherein the payment is linked to the order based at least in part on the confirmation number.

26. The method of claim 25, further comprising:
receiving, by the computerized merchant system, on behalf of the unbanked consumer, a request to submit the payment via the offline mechanism;
transmitting, by the computerized merchant system to a financial system, an indication of the request; and
receiving, by the computerized merchant system from the financial system, the confirmation number.

27. The method of claim 25, wherein the order is received from the financial system.

28. The method of claim 25, further comprising:
receiving, by the computerized merchant system, an electronic credit responsive to receipt of the payment from the unbanked customer via the offline mechanism.

* * * * *